UNITED STATES PATENT OFFICE.

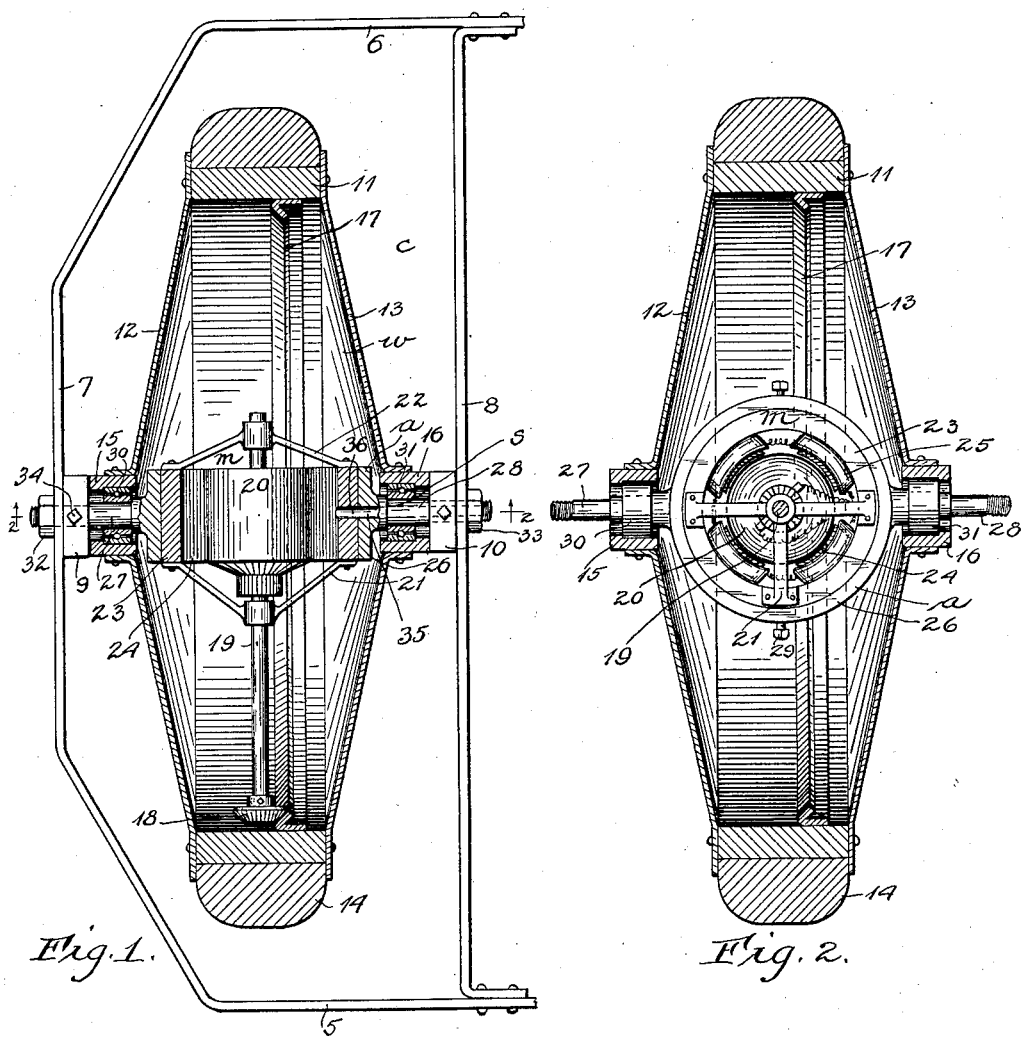
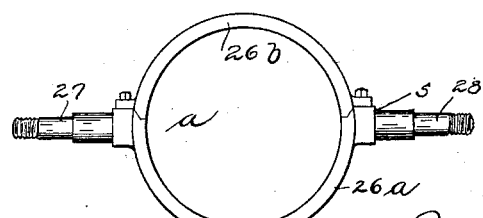
R. MACRAE.
WHEEL STRUCTURE.
APPLICATION FILED FEB. 26, 1912.
1,075,717.
Patented Oct. 14, 1913.
Fig. 1.
Fig. 2.
Fig. 3.
Witnesses:
Charles J. Schmidt.
Nellie B. Dearborn
Inventor:
Roderick Macrae.
By Offield, Towle, Graves & Offield
Attys.

RODERICK MACRAE, OF CHICAGO, ILLINOIS.

WHEEL STRUCTURE.

1,075,717.  Specification of Letters Patent.  Patented Oct. 14, 1913.

Application filed February 26, 1912. Serial No. 680,096.

*To all whom it may concern:*

Be it known that I, RODERICK MACRAE, a resident of Chicago, in the county of Cook and State of Illinois, have invented certain new and useful Improvements in Wheel Structures, of which the following is a specification.

My invention relates to wheel structures, particularly to wheel structures in which the driving motor is carried within the wheel.

My invention is particularly adaptable in electric power vehicle wheel construction, and may be considered as an improvement over the arrangement and construction dis15 closed in my co-pending application, Serial No. 608,333 filed January 13, 1911. In this construction, as also in other prior art constructions, the field frame of an electric motor has lateral trunnion extensions forming an axle for the wheel, these extensions being rigidly secured to the vehicle body so that upon operation of the motor the wheel will turn to propel the vehicle. In this construction, therefore, the wheel axles form a struc25 tural part of the motor itself, and if the extensions should become broken or worn it becomes necessary to install a new field frame. Also, whenever it is desired to remove and inspect the motor the entire struc30 ture must be removed from the wheel. Again, motors of special construction, particularly as to the field frame, can only be used.

The broad object of my invention is there35 fore to provide an axle structure and support for the motor which is entirely independent of the motor structure itself, so that motors of ordinary commercial design can be installed and can be removed bodily without any dissemination of parts.

More in detail, the important objects are to provide an axle structure for the wheel entirely independent of the motor or any part thereof and which can seat or house a complete motor of ordinary commercial construction in such a manner that the entire motor can be inserted and readily withdrawn; to provide a supporting structure of simple and strong design; and to provide such arrangement that the motor can be adjusted to any supporting structure to thereby adjust the driving relation of the motor and wheel rim to be driven.

The various features of my invention will be clearly understood by reference to the accompanying drawings, in which—

Figure 1 is a plan view of one end of a steering truck structure showing the wheel frame and the motor supporting frame in diametrical section. Fig. 2 is a vertical diametral sectional view of the wheel structure in Fig. 1, showing the motor and supporting frame structure in elevation, and Fig. 3 shows a modified form of motor supporting frame.

Referring to Fig. 1, the arrangement of the wheel with reference to the truck is the same as in my co-pending application above referred to, the truck frame having axle bearing at both sides of the wheel so that the load on the wheel is equalized. The truck frame shown comprises front and rear transverse beams 5 and 6 connected by the side beam 7 and by the intermediate beam 8, the beams at each end of the truck frame forming a compartment *c* for accommodating the wheel *w*. Extending downwardly from the side and intermediate beams are bearing blocks 9 and 10 for receiving the wheel axle. The wheel may be of any construction, and as shown comprises a rim 11 having sheet metal sides 12 and 13 secured thereto and mounting the tire 14, the centers of the sides securing bearing hubs 15 and 16. The rim 11 supports on its inner face an internal bevel gearing 17 with which meshes the driving pinion 18 on the shaft 19 carrying the armature 20 of the electric motor *m*. The armature shaft is journaled in bearing brackets 21 and 22 secured to the opposite ends of the field frame 23, whose poles 24 support field windings 25. The motor may be of any ordinary commercial construction, and in order to support the motor within the wheel the axle structure *a* for the wheel comprises a body part in the form of a frame or housing 26, and the axle sections 27 and 28 extending therefrom have bearing engagement with the hubs of the wheel.

As shown in Figs. 1 and 2, the axle structure body part 26 is circular and arranged with its axis horizontal, the field frame of the motor having a cylindrical periphery so as to fit snugly into the part 26 to be secured therein as by set screws 29. The axle ends 27 and 28 extend through the hubs 15 and 16, ball bearings 30 and 31 being preferably interposed, the axle ends having shoulders s against which the ball bearings abut. The outer ends of the axles pass through the extensions 9 and 10 and are threaded to receive nuts 32 and 33, set screws 34 or other suitable means being provided to rigidly lock the axle ends to the frame extensions. Thus when the motor is operated its supporting structure will remain stationary and the wheel structure will be turned to propel the vehicle. Although the motor field frame snugly fits the supporting part 26 it can nevertheless be adjusted longitudinally therein so that accurate driving connection between the motor pinion and the gear on the wheel can be maintained. After such adjustment screws 29 are set and the motor structure locked in its adjusted position. If it is desired to inspect or repair the motor the motor structure as a whole can be readily removed from the wheel. Instead of being circular the supporting part 26 may be rectangular or hexagonal, or of any other shape to conform to the shape of the motor field frame. In fact, any commercial form of motor can be adopted and the part 26 of the axle structure shaped accordingly to form a seat or housing for accommodating the motor.

In Figs. 1 and 2 the axle structure is an integral structure and may be cast, forged or otherwise constructed. In Fig. 3 the axle structure comprises two parts, the lower part 26$^a$ having integral therewith the axle sections 27 and 28 and the top part 26$^b$ being bolted to the lower part to form the supporting frame. With this arrangement the motor structure can be readily lifted from its seat by removing the top part 26$^b$.

In my arrangement the motor is therefore a structure by itself independent of the axle frame which supports it and is a definite improvement over prior art arrangements in which the axle ends extended directly from and formed part of the motor field frame. In prior constructions breakage or wear of the axle frame made it necessary to install a new field frame, but in my arrangement the motor structure or its operation is not affected by breakage of the separate supporting frame structure.

My improvement is of course applicable to an arrangement such as shown, in which both axle ends are journaled to the truck frame, or to other arrangements in which only one axle end is pivoted or journaled to the truck frame, as for example, one axle section could form part of the knuckle couplings commonly used in automobiles and other power driven vehicles. In either case, however, current supply conductors for the motor could extend through passageway 35 in one of the axle ends and through a registering passageway 36 in the motor field frame.

I do not desire to be limited to the precise construction and arrangement shown and described, as other embodiments of the invention are possible which would still come within the scope of the invention, and I therefore claim the following:

1. In a power driven vehicle, the combination with the wheel structure having bearing hubs, a structure within said wheel structure forming a seat and having axle stubs extending therefrom into said hubs, and a motor adjustably and detachably mounted on said seat and having driving connection with the wheel structure.

2. In a power driven wheel, the combination with the wheel structure having bearing hubs, of an axle structure having a body part within said wheel and having axle ends extending outwardly through said hubs to form bearings for said wheel structure, said axle ends being adapted for rigid connection with a vehicle body, an electric motor within said wheel having its field frame adjustably and detachably seated on the axle structure body part and supported thereby, and driving connection between the motor and the wheel structure.

3. In a power driven vehicle wheel, the combination with the wheel structure having bearing hubs, of an axle structure having an annular body part within the wheel forming a supporting inclosure and having axle ends extending outwardly through said bearing hubs and adapted for rigid connection with a vehicle body, and a driving motor detachably secured within said annular supporting inclosure and having driving connection with said wheel structure.

4. In a power driven vehicle wheel, the combination with the wheel structure having bearing hubs, of an axle structure expanded within the wheel structure to form an annular supporting band and having ends extending through said hubs to form bearing surfaces therefor and a motor detachably and adjustably supported within said band and having driving connection with the wheel structure.

5. In a power driven vehicle wheel, the combination with the wheel structure having bearing hubs, of an axle structure having a part within the wheel deflected to form a seating pocket and having its ends extending through said hubs to provide bearing surfaces therefor, a motor seated on said deflected axle part within the wheel structure, and member engaging with said motor structure and secured to the axle structure for clamping said motor in place on the axle structure.

6. In a power driven vehicle wheel, the combination with the wheel structure having bearing hubs, of an axle structure bearing in said hubs at its ends and having its part within the wheel structure expanded to form an annular supporting band, a motor having a field frame whose outer surface conforms to the inner surface of said supporting band whereby said field frame snugly fits in said supporting band but is free to be moved therein whereby the motor structure as a whole may be adjusted, and driving connection between said motor and wheel adjusted upon such shifting of the motor structure.

In witness hereof, I hereunto subscribe my name this 12th day of February, A. D., 1912.

RODERICK MACRAE.

Witnesses:
CHARLES J. SCHMIDT,
NELLIE B. DEARBORN.